United States Patent [19]

Everman

[11] Patent Number: 4,895,046

[45] Date of Patent: Jan. 23, 1990

[54] INCREMENTAL DRIVES

[76] Inventor: Michael R. Everman, 4981 Yaple Ave., Santa Barbara, Calif. 93111

[21] Appl. No.: 264,092

[22] Filed: Oct. 28, 1988

[51] Int. Cl.$^4$ .............................................. F16H 53/06
[52] U.S. Cl. ........................................ 74/569; 74/112; 74/122
[58] Field of Search ............... 74/84 R, 111, 112, 122, 74/125, 569, 25, 118, 54

[56] References Cited

U.S. PATENT DOCUMENTS

| 646,287 | 3/1900 | Hundhausen | 74/118 X |
| 4,653,344 | 3/1987 | Nelson | 74/122 X |

FOREIGN PATENT DOCUMENTS

| 234080 | 4/1969 | U.S.S.R. | 74/122 |
| 2054794 | 2/1981 | United Kingdom | 74/122 |

Primary Examiner—Rodney M. Lindsey
Attorney, Agent, or Firm—Donald D. Mon

[57] ABSTRACT

An incremental drive for the incremental driving of a rotary shaft or of a line device, having a rotary driver shaft adapted to be driven by a power means. A plurality of cams are mounted on the drive shaft each having an offset camming surface relative to the axis of rotation of the driver shaft. A shoe with a respective engagement face is fitted to a respective cam. A driven element—rotary or linear—is sequentially contacted by the engagement faces. The driver shaft is resiliently biased toward the driven element. Rotation of the driver shaft causes the shoes sequentially to drive the driven element, and the resilient bias maintains driving contact and enables relief of the shoes from the driven element during operation.

10 Claims, 2 Drawing Sheets

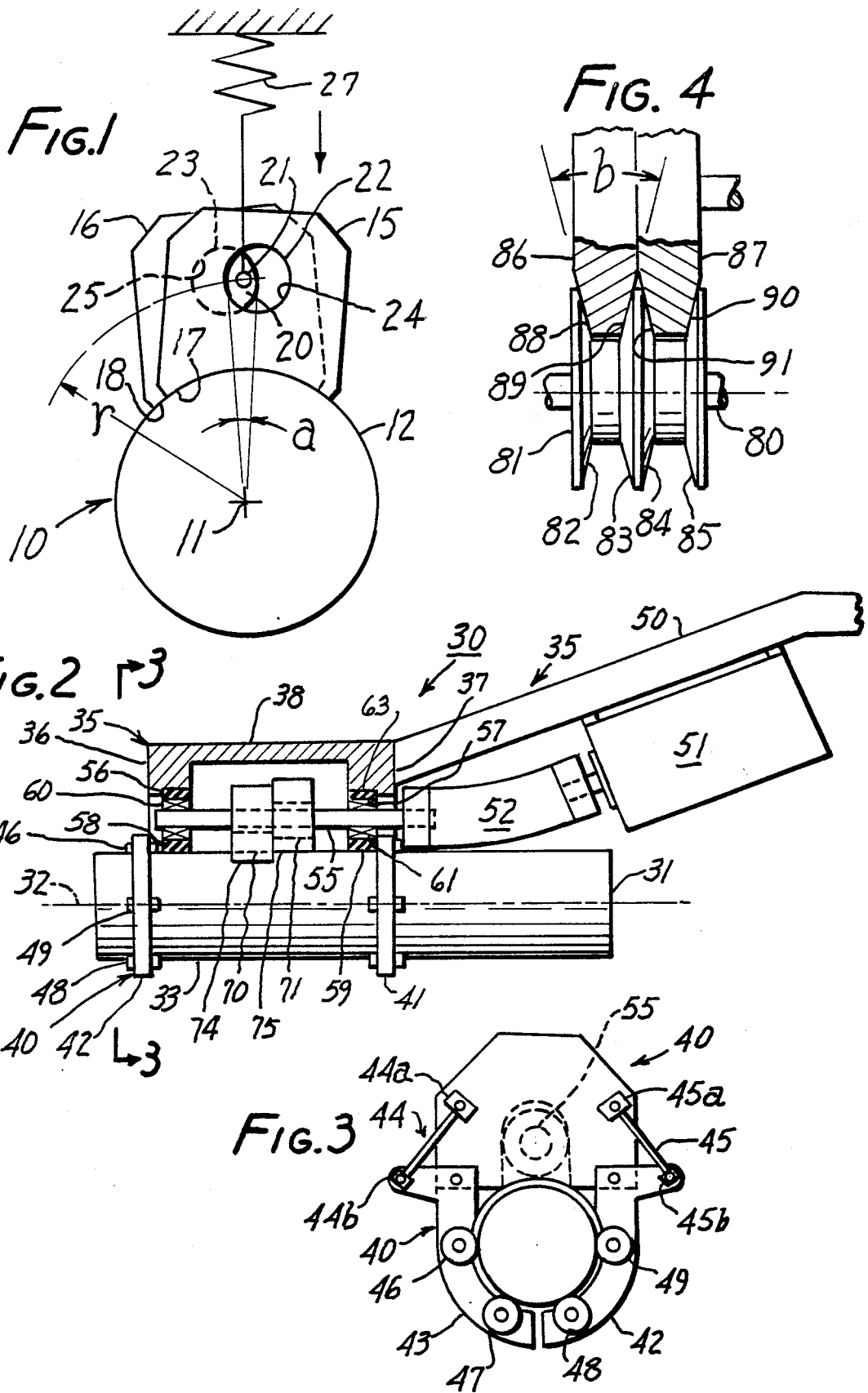

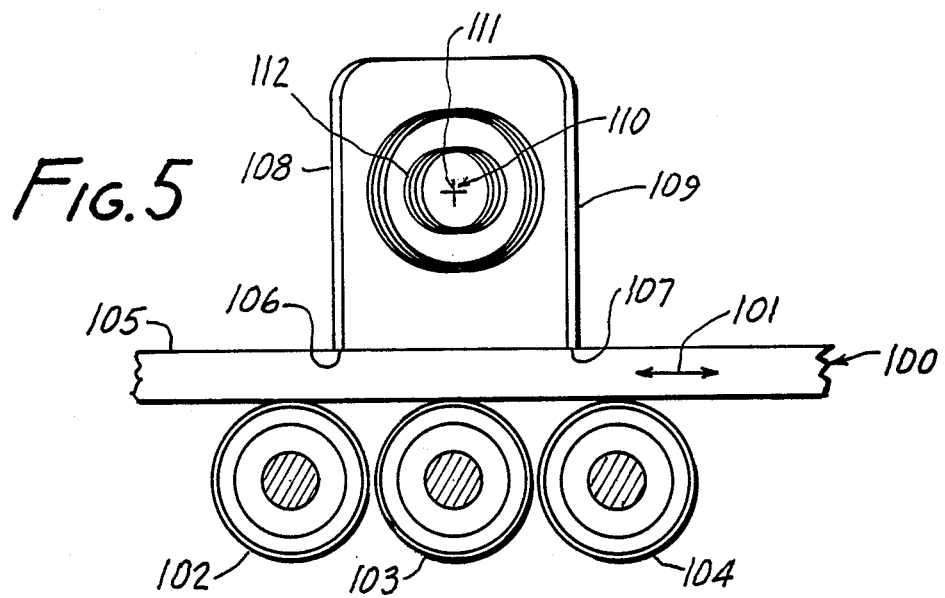
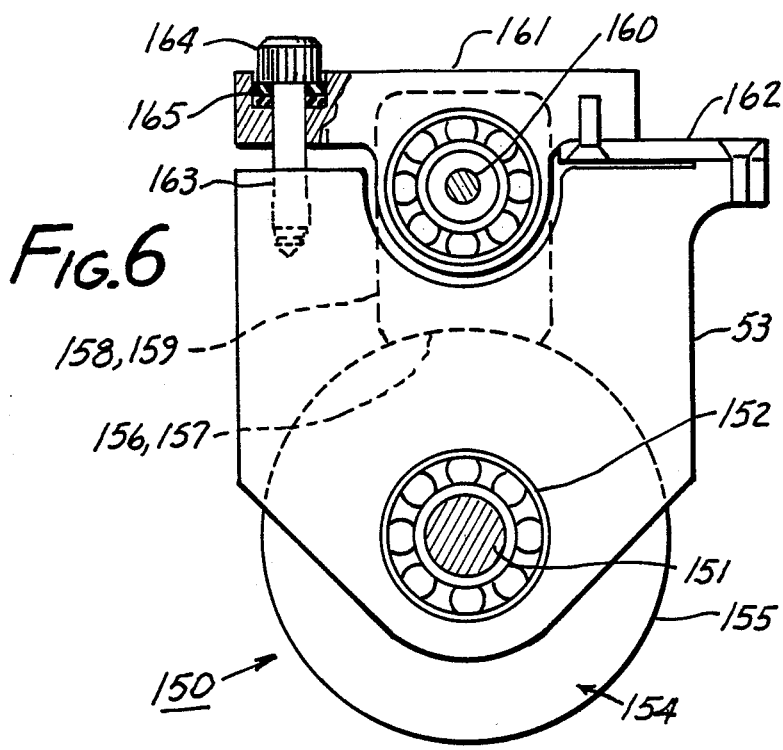

INCREMENTAL DRIVES

FIELD OF THE INVENTION

This invention relates to rotary or linear power drives, and especially to a drive which can produce incremental motion such as incremental rotation or incremental traction-type translation.

BACKGROUND OF THE INVENTION

The rotation of powered driver shafts is commonly applied to rotary driven shafts, or to linear mechanisms to change their position, either rotationally or linearly. In many of these applications, continuous application of power to produce a steady continuous output is desired. In others, an incremental stepping operation is preferred, and for all these applications a considerable number of drives have been devised. Ratchet movements and stepper motors are two well-known examples.

Designers of incremental drives have over the years responded to new requirements imposed in their respective arts. In most cases these responded to needs which, as to those known to the applicant herein, nicely fitted the situations in which they were to function. Examples of such efforts are shown in U.S. patents to Hockett 430,021, Hundhausen 646,287, and Harbidge 3,363,673. Of less pertinence, but perhaps of greater interest is Knollin 461,441.

It is of at least historical interest to observe that the prior art efforts were generally directed toward heavy duty applications which were of commercial interest at their time. The propulsion of conveyances, the driving of rotary kilns, or the positioning of machine tool tables were, and for decades remained, primary contemporary requirements of heavy American industry.

However, these applications were succeeded by requirements which formed part of a more sophisticated and lighter emerging technology. Smaller, finer movements for lighter devices became of importance which the older devices could not supply. Modern examples of new applications are to be found in robotics, where the equivalent is needed of a scissors movement—the clamping action of a finger versus an opposable thumb, the twisting movement exemplified by rotation of the wrist, or a small linear displacement. It is not surprising that the prior art heavy duty devices did not provide the needs of the next generation, even though both had the same objective of incremental power transmission and high ratio power reduction. Convenience, least weight, and transmission of relatively low power loads were of little or no interest then. If a mechanism weighed an extra few pounds it did not matter. Today it does.

BRIEF DESCRIPTION OF THE INVENTION

An incremental driver according to this invention is intended to drive a user device such as a shaft or a rod. It includes a powered driver shaft adapted to be connected to the output shaft of a power means such as an electric motor. The driver shaft carries at least two eccentric cams which are out of phase with each other, preferably 180 degrees out of phase.

Each cam drives a respective rotator shoe. Each shoe has an engagement face conformable with a complementary surface on the user element. When the user element is a rotary device, the engagement surface will be a surface of revolution centered on the central axis of rotation of the user shaft. If it is a linear output, the surfaces will be generally planar. Each cam is journaled in a bearing in its respective rotator shoe, spaced from and aligned with the center of their respective engagement face. Rotation of the driver shaft and thereby of the cams, drives the rotator shoes in an oscillating pattern.

The driver shaft is floatingly mounted to a base, and is springily biased toward the user shaft. It is limited to movement normal to the complementary surface on the user element. Accordingly, rotation of the cams alternately presses the engagement face of each rotator shoe against the surface on the user element and while so pressed, causes the rotator shoe to move the user element. The next half cycle of cam rotation lifts the rotator shoe and returns it to a starting position. Thus there results a continuous application of driving half cycles, alternately from one shoe to the other, to drive the user element. The driver shaft may conveniently be made bi-directional, because this drive is reversibly operable.

According to optional features of the invention, the engagement faces and surfaces are frustums of cones or grooves, or are shapes that are other than circularly cylindrical or planar. This can increase the force derived from friction, and better enables the shoes to drive the user shaft, or can provide different output modes.

The above and other features of the invention will be fully understood from the following detailed description and the accompanying drawings, in which:

BRIEF DESCRIPTION OF THE DRAWINGS

FIG. 1 is a schematic illustration showing the concept of the drive;

FIG. 2 is a side view of another embodiment of the invention

FIG. 3 is a cross-section taken at line 3—3 in FIG. 2;

FIG. 4 is a fragmentary side view showing a preferred configuration of engagement faces and surfaces for rotary outputs;

FIG. 5 a system for linear output; and

FIG. 6 shows the presently-preferred embodiment of the invention.

DETAILED DESCRIPTION OF THE INVENTION

FIG. 1 shows the generic concept of the invention. A user shaft 10 is shown which is to be rotated around its central axis 11. It has an outer surface 12 which is a surface of revolution around axis 11. It is shown as a right circular cylinder in this instructive example.

A pair of rotator shoes 15, 16 have respective engagement faces 17, 18. They are fragments of a surface of revolution, the obverse (complement) of surface 12. The surface and faces are complementary and are preferably faced or coated with a high coefficient of friction material, because the driving force on the user shaft is limited to the force which can be exerted without slippage.

A driver shaft 20 has a center of rotation 21. It carries a pair of eccentric cams 22, 23 each of which is circularly cylindrical with its own center displaced eccentrically from center 21. Each cam fits in a respective bearing 24, 25 in shoes 15, 16.

Driver shaft 20 is supported by end plates (not shown) in such a way that it floats and can move axially along an extended radius r of the user shaft. Resilient bias means 27, such as an elastomeric body or a compression spring biases the driver shaft toward the user shaft. Mounting means (not shown in FIG. 1) holds the driver shaft to the user shaft.

In FIG. 1, angle "a" shows the extremes of movement of the centers of the cams, and thereby also illustrates the angular travel of the shoes for each half cycle. Each shoe is shown at an extreme position ready to drive or to release, depending on the direction of rotation of the driver shaft. On further rotation, one shoe will be lifted by its cam. The other will be pressed against the user shaft and will drive the user shaft through the angular increment "a". The driver shaft will float radially to accommodate the dimensional interferences.

By way of example, if "r" equals 0.875 inches, and the eccentricity of each cam is 0.003 inches, the approximate ratio of rotation of the driver shaft and of the user shaft is 458:1. Very small incremental movements result per revolution of the driver shaft, and fine movements can be made by counting the revolutions of the driver shaft itself. The driver shaft can be run at a substantial speed, so that while the ratio is high (and can be made higher or lower), substantial power can be delivered at very useful rates of angular motion.

While in each cycle there is an instant of concurrency of the two cam actions, it is vanishingly small and of no operative importance.

A practical and successful embodiment of incremental drive 30 is shown in FIGS. 2 and 3. Its function is to drive a user shaft 31 having a center of rotation 32. Its engagement surface 33 is the outer surface of the user shaft where it is contacted by this drive.

The drive has a frame 35 with a pair of end plates 36, 37. The end plates are held together by crosspieces. Crosspiece 38 is an example of these. More than one of such pieces will usually be provided.

When the drive is to be independently mounted to the user device mounting means 40, 41 are provided which are mounted respectively to end plates 36 and 37. Both are identical, so that only mounting means 40 will be described in detail. It has a pair of jaws 42, 43 pivotally mounted to end plate 36. Screw mechanisms 44, 45, include screws which can be directly threaded in trunnions 44a, 45a and fitted in sockets 44b, 45b, or perhaps remotely turned by a motor, to open and close the jaws. The jaws carry rollers 46, 47, 48, 49 which, with the rotator shoes, will hold the driver to the user shaft for driving rotation.

A handle 50 can be attached to one of the end plates. A drive motor 51 can be mounted to the handle or mounted directly to the end plate if preferred. If the motor is situated at an angle as shown, a U-joint 52 or other angular transmission device will be provided. A driver shaft 55 is mounted to and extends between the end plates. It is keyed to the drive motor or to the U-joint so as to be rotated by the motor.

Sockets 56, 57 in end plates 36 and 37 receive the driver shaft. Elastomeric rings 58, 59 respectively fit onto bearings 60, 61. The driver shaft fits in the bearings. Thus, rings 58 and 59 form a resilient biasing system biasing the driver shaft toward the user element. The elastic deformation of this elastomeric ring acts as a spring, which resiliently opposes the radial movement of the driver shaft. With the cam it creates the force which the rotator shoes will exert against the user shaft.

Eccentric cams 70, 71 as described in FIG. 1 are formed on the driver shaft, 180 degrees out of phase from each other. They fit in bearings in rotator shoes 74, 75.

Rotator shoes 74, 75 have respective engagement faces similar to those in FIG. 1. Both are identical and have a shape complementary to the engagement surface on the user shaft. The eccentricity is as described in FIG. 1.

The operation of this embodiment is as described in FIG. 1, noting that the resilient bias force in FIG. 2 is exerted by means of an elastomeric ring rather than by a spring.

The force to drive this system is dependent on the coefficient of friction, the total area of engagement, and the normal force between the engagement faces and surfaces. Right circular cylindrical shapes represent one example. FIG. 4 shows a variation which often will be preferred. In this fragmentary view, a user shaft 80 has a pulley-like structure 81 with peripheral engagement surfaces 82, 83, 84, and 85. These are frustums of cones. Rotator shoes 86, 87 have complementary engagement faces 88, 89, 90, and 91 which are fragments of frustums of cones. When pressed into the groove-like structure between the pairs of engagement surfaces, a wedging action occurs which provides some additional interengagement force between the rotator shoes and the engagement surfaces. This is an advantage additional to the enlargement of the abutting surfaces.

The included angle "b" between the engagement surfaces in FIG. 4 must be larger than the friction locking angle of the materials, or the device might lock up. When metal surfaces are used, an angle "b" greater than about 30 degrees is usually sufficient.

The rotation of the user shaft in FIGS. 1–4 can readily be converted to linear motion by the use of worm and gear devices, or of other types of rotary-to-linear conversion devices. However, many of these are complicated and weighty, and also involve problems of backlash. This invention enables a direct drive of a linear device, without the use of a rotary-to-linear conversion mechanism, and without backlash.

FIG. 5 shows such a device. A linear user device 100, such as a rod or a plate having an axis 101 of movement is backed by a group of idler wheels 102, 103, 104. These stabilize the user device for bi-directional movement. The device has an axially extending engagement surface 105. It is complementary to engagement surfaces 106, 107 each on a respective shoe 108, 109. Surfaces 106 and 107 are preferably flat, although it is possible to configure them for more effective engagement by grooving, or knurling, facing, or otherwise as desired.

A driver shaft 110 with a central axis of rotation 111 carries a pair of offset cams 112. As in FIG. 1 they are fitted in shoes 108, 109. As in FIG. 1, the cams are rotationally offset by 180 degrees, and driver shaft 110 is resiliently biased toward surface 105. Thus, rotation of shaft 110 will sequentially press one of the shoes into contact with surface 105 and move it linearly. The other shoe will be returning to its next starting position. Reverse rotation will move the drive element in the opposite direction.

Driver shaft 110 is resiliently loaded in the same sense as it is in the other embodiment. The embodiment of FIG. 5 illustrates the fact that the movement of the drive element is transverse to a normal to the engaging surfaces. In rotary devices the surfaces are "bent". In linear devices the surfaces are flat. Except for these shapes and the different output the operation of all embodiments is the same.

FIG. 6 shows a convenient rotary drive 150. It includes an output shaft 151 journaled by bearings 152 in a pair of joined spaced apart end plates 153 that form part of a frame. A ring-like enlargement 154 has a peripheral surface 155 complementary to the enlargement faces 156, 157 of shoes 158, 159, as in FIG. 1.

Driver shaft 160 is rotatably fitted in a mounting block 161. A plate-like flexure 162 enables the block to move toward and away from the output shaft. A retainer bolt 163 is threaded into the frame. It passes freely through a hole in the mounting block, and has a head 164 above it. The head compresses a spring 165, which may be a stack of Belleville washers, to bias the driver shaft toward the output shaft.

The function of the device of FIG. 6 is identical to that of FIGS. 1-4.

The operation of the devices should be evident from the foregoing. In the driving direction one rotator shoe is pressed against the user shaft and turns it, while the other is lifted to return to its starting point. The action is repeated to continue the driving action.

The devices can stand alone, or they can readily be attached to a next assembly such as to a robot arm. The rotary output can be used as such, or can be converted to a linear output if preferred.

This invention is not to be limited by the embodiments shown in the drawings and described in the description, which are given by way of example and not of limitation, but only in accordance with the scope of the appended claims.

I claim:

1. An incremental drive comprising:
    a rotary driver shaft having an axis of rotation, said driver shaft being adapted to be driven by a power means;
    a plurality of cams mounted on said driver shaft which are rotated therewith and which have offset camming surfaces that are eccentric to the axis of rotation of the driver shaft;
    a shoe respective to each of said cams, each shoe being fitted to its respective cam to be eccentrically moved by its cam when the driver shaft is rotated, each said shoe including an engagement face;
    a driven element having an engagement surface so disposed and arranged as to be contacted by the face of said shoes;
    bias means resiliently exerting a lateral force on said driver shaft to press it toward said driven element; whereby rotation of said driver shaft causes said cams sequentially to press one of said shoes against said driven element and move it, while relieving another of said shoes from such contact and returning it to a position where it will again be pressed against it, thereby to move the driven element.

2. An incremental drive according to claim 1 in which said driven element is a rotatable shaft having an axis of rotation which is parallel to the axis of rotation of the driver shaft.

3. An incremental drive according to claim 2 in which said cams are circular, and are circularly journaled to said shoes eccentrically from the axis of rotation of said driver shaft.

4. An incremental drive according to claim 2 in which the engagement surface on said driven element is a surface of revolution, and said faces on said shoes are complementary to it.

5. An incremental drive according to claim 4 in which said surface of revolution is cylindrical.

6. An incremental drive according to claim 4 in which said surface revolution is the frustum of a cone.

7. An incremental drive according to claim 1 in which said driven element is a linear device with an axis of motion in a plane parallel to the axis of rotation of said driver shaft, its engagement surface lying in said plane.

8. An incremental drive according to claim 7 in which said cams are circular and are circularly journaled to said shoes eccentrically from the axis of rotation of said driver shaft.

9. An incremental drive according to claim 8 in which said engagement surface is planar.

10. An incremental drive according to claim 1 in which the driver shaft is rotatably mounted to a mounting block, the driven element flexibly mounted to a frame in which said driven element is journaled, a flexure resiliently and flexibly mounting said mounting block to said frame.

* * * * *